US006925221B2

(12) United States Patent
Maitan

(10) Patent No.: US 6,925,221 B2
(45) Date of Patent: Aug. 2, 2005

(54) CONTROL SYSTEM FOR AN OPTICAL FIBER SWITCH

(75) Inventor: Jacek Maitan, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/842,033

(22) Filed: May 7, 2004

(65) Prior Publication Data
US 2004/0208425 A1 Oct. 21, 2004

Related U.S. Application Data

(62) Division of application No. 09/999,705, filed on Oct. 24, 2001.

(51) Int. Cl.[7] .............................................. G02B 6/26
(52) U.S. Cl. ............................ 385/17; 385/18; 372/70; 372/20
(58) Field of Search ............................ 385/17, 16, 18, 385/25, 27, 31, 40, 52; 372/70, 20

(56) References Cited

U.S. PATENT DOCUMENTS

| 4,319,839 | A | 3/1982 | Durran |
| 4,996,412 | A | 2/1991 | Anafi et al. |
| 5,177,348 | A | 1/1993 | Laor |
| 5,309,537 | A | 5/1994 | Chun et al. |
| 5,319,509 | A | 6/1994 | Michelson et al. |
| 5,647,033 | A | 7/1997 | Laughlin |
| 5,864,643 | A | 1/1999 | Pan |
| 5,960,132 | A | 9/1999 | Lin |
| 6,130,984 | A | 10/2000 | Shen et al. |
| 6,154,433 | A | 11/2000 | Hoshino et al. |
| 6,181,864 | B1 | 1/2001 | Jang et al. |

(Continued)

| 6,222,954 | B1 | 4/2001 | Riza |
| 6,229,640 | B1 | 5/2001 | Zhang |
| 6,289,145 | B1 | 9/2001 | Solgaard et al. |

FOREIGN PATENT DOCUMENTS

| WO | WO 01/24384 A2 | 4/2001 |
| WO | WO 01/53875 A1 | 7/2001 |

OTHER PUBLICATIONS

Bishop, David et al., "Micromirrors Relieve Communications Bottlenecks," *Photonics Spectra*, Mar. 2000, pp. 167–169.

Bishop, David J. et al., "The Rise of Optical Switching," *Scientific American*, Jan. 2001, pp. 74–79.

Neilson, D.T. et al., " Fully Provisioned 112×112 Micro-Mechanical Optical Crossconnect With 35.8Tb/s Demonstrated Capacity," Optical Fiber Communication Conference, Technical Digest Postconference Edition, Trends in Optics and Photonics vol. 37, pp. 202–204, 2000, Washington, D.C., USA.

*Primary Examiner*—Kianni C. Kaveh
(74) *Attorney, Agent, or Firm*—Blakely, Sokoloff, Taylor & Zafman LLP

(57) ABSTRACT

An optical switching fabric enables an optical signal entering the device on any one of multiple input ports to be directed to any one of multiple output ports. Light entering the switching fabric on an input port is reflected by individual mirrors on one or more mirror arrays to an output port. Methods of controlling optical switching fabrics compensate for distortions due to mechanical and environmental changes without the need to measure losses along all optical paths linking input ports and output ports. Reference input ports are interspersed among signal input ports and reference output ports are interspersed among signal output ports. Periodically, the positions of mirrors which maximize the intensity of light deflected from reference input ports and reference output ports, are measured. The measured positions are used to predict mirror positions to maximize the intensity of light deflected from signal input ports to signal output ports.

13 Claims, 7 Drawing Sheets

U.S. PATENT DOCUMENTS

| | | |
|---|---|---|
| 6,295,400 B1 | 9/2001 | Shahid |
| 6,320,993 B1 | 11/2001 | Laor |
| 6,327,398 B1 | 12/2001 | Solgaard et al. |
| 6,363,183 B1 * | 3/2002 | Koh .......................... 385/19 |
| 6,374,032 B1 | 4/2002 | Mao et al. |
| 6,411,751 B1 * | 6/2002 | Giles et al. ................... 385/16 |
| 6,427,038 B1 * | 7/2002 | Britz et al. ................... 385/18 |
| 6,456,751 B1 * | 9/2002 | Bowers et al. ................ 385/16 |
| 6,470,110 B1 | 10/2002 | Lin |
| 6,470,123 B1 | 10/2002 | Sherman et al. |
| 6,480,320 B2 | 11/2002 | Nasiri |
| 6,483,962 B1 | 11/2002 | Novotny |
| 6,549,692 B1 | 4/2003 | Harel et al. |
| 6,567,574 B1 | 5/2003 | Ma et al. |
| 6,587,611 B1 * | 7/2003 | Hunt .......................... 385/18 |
| 6,610,974 B1 * | 8/2003 | Hunt et al. ............ 250/227.22 |
| 6,614,954 B2 | 9/2003 | Huang et al. |
| 6,631,222 B1 * | 10/2003 | Wagener et al. .............. 385/16 |
| 6,632,374 B1 | 10/2003 | Rosa et al. |
| 6,636,656 B2 | 10/2003 | Huang et al. |
| 6,690,849 B1 | 2/2004 | Dadap, Jr. et al. |
| 6,690,885 B1 | 2/2004 | Aksyuk et al. |
| 2002/0114566 A1 | 8/2002 | Fairchild et al. |
| 2002/0131682 A1 | 9/2002 | Nasiri et al. |
| 2002/0186918 A1 | 12/2002 | Burroughs |
| 2002/0191901 A1 | 12/2002 | Jensen |
| 2003/0007148 A1 | 1/2003 | Moon et al. |
| 2003/0012509 A1 | 1/2003 | Chang et al. |
| 2003/0026582 A1 | 2/2003 | Hout et al. |
| 2003/0068117 A1 | 4/2003 | Syms |
| 2004/0169909 A1 | 9/2004 | Miller |

* cited by examiner

_US 6,925,221 B2_

CONTROL SYSTEM FOR AN OPTICAL FIBER SWITCH

CROSS REFERENCE TO RELATED APPLICATIONS

This application is a divisional of, and claims priority from, U.S. patent application Ser. No. 09/999,705, filed Oct. 24, 2001, and currently pending.

This application is related to the following co-filed, commonly assigned, U.S. patent applications: U.S. patent application Ser. No. 09/999,878, U.S. patent application Ser. No. 09/999,610, U.S. patent application Ser. No. 10/003,659, now issued U.S. Pat. No. 6,614,954, and U.S. patent application Ser. No. 10/002,310, now issued U.S. Pat. No. 6,636,656, all of which are incorporated herein by reference. This application is also related to U.S. patent application Ser. No. 09/779,189 entitled "A Microelectromechanical Mirror," filed Feb. 7, 2001, now issued U.S. Pat. No. 6,480,320, assigned to the assignee of the present invention, and incorporated herein by reference.

FIELD OF THE INVENTION

This invention relates generally to switches for optical networks and in particular to control systems for optical fiber switches.

BACKGROUND

As optical fiber progressively supplements and replaces metal wire as the backbone of telecommunications networks, the switches that route optical signals have emerged as a significant bottleneck. Transmission systems move information as optical photons but the switching systems and so-called crossconnect fabrics that switch, route, multiplex, and demultiplex optical signals have generally been electronic. Electronic switching requires light to be converted to an electronic signal to pass through the switch and then be reconverted to light in a process termed optical-electronic-optical (OEO) conversion that introduces both time delay and cost.

There is great interest in the telecommunications industry, therefore, in developing all optical switching to avoid the necessity of multiple OEO conversions. On long haul networks, ten's or hundred's of individual wavelengths, each carrying a signal, are multiplexed onto each fiber. Switches are desired that provide all optical switching at the fiber level, the wavelength level, or at both levels. As described, for example, by Bishop et al. in *Scientific American* (January, 2001, pp 88–94), all optical switches based on a number of underlying technologies including Micro Electro Mechanical Systems (MEMS) tilting mirrors, thermo-optical devices, bubbles formed by inkjet printing heads, and liquid crystals, have been proposed. Optical fiber switches based on MEMS mirrors are particularly attractive because they can incorporate very large scale integrated circuits and can be robust, long-lived, and scalable.

An optical fiber switch described in U.S. Pat. No. 5,960,132 to Lin, for example, includes an array of hinged MEMS mirrors, each of which can be rotated about its hinge between a reflective state and a non-reflective state. An array of $N^2$ such mirrors is required to switch signals carried by N input optical fibers from one to another of N output optical fibers. Unfortunately, $N^2$ scaling results in unmanageably complex devices for large N.

Another optical fiber switch described in Bishop et al., cited above, as well as in Bishop et al., Photonics Spectra (March 2000, pp. 167–169) includes an array of MEMS mirrors disposed on a single surface. Each mirror tilts independently to direct light received from an array of input/output optical fibers to any other mirror and thus to any input/output fiber. No internal optical diagnostics for this switch have been described in publications to date.

Still other optical fiber switches are based on two arrays of MEMS mirrors that can be tilted in any direction. Incoming light is directed onto a mirror in the first array which deflects it onto a predetermined mirror in the second array. The mirror in the second array, in turn, directs the light received at a particular input mirror to the predetermined output port. In these so-called, 2N configurations, the position of the mirrors has to be controlled very precisely, to small fractions of degrees, to provide the desired connections.

The precise positioning of mirrors can be affected by environmental factors, such as vibration, and changes in temperature or humidity, and by slow drift of voltages used to control the mirrors. These ongoing effects on the alignment and control of mirrors causes difficulty and degradation in the performance of optical switches based on MEMS mirrors.

Therefore, there is a need for improved methods of calibration and control of optical switches in order to further the development of fiber optic telecommunication networks.

SUMMARY

In accordance with the present invention, a MEMS based optical switching fabric with dynamic calibration and control is presented. An optical switching fabric is an optical switch with multiple input ports and multiple output ports that allows an optical signal entering the device on any input port to be directed to any output port. Methods of controlling optical switching fabrics, according to embodiments of the present invention, can compensate for distortions due to mechanical and environmental changes without the need to measure losses along all optical paths linking input ports and output ports.

In some embodiments of the invention, a certain number of input ports are dedicated as reference input ports and interspersed among signal input ports. Similarly, reference output ports are interspersed among signal output ports. In general, any number of mirror arrays can be utilized to divert light from a particular input port to a corresponding selected output port. A reference light source providing reference beams is attached to the reference input ports and a reference photodetector is attached to the reference output ports. In some optical switching fabrics, for example, an input signal entering the switch on an input port is deflected by a corresponding mirror on a first mirror array to a selected mirror on a second mirror array which deflects the signal to a corresponding output port.

According to the present methods, periodically the positions of mirrors on the mirror arrays, for example mirrors on the first mirror array, corresponding to reference input ports, and of mirrors on the second mirror array, corresponding to reference output ports, which maximize the intensity of light deflected from reference input ports and reference output ports are measured. The measured positions are used to predict corrected mirror positions to maximize the intensity of light deflected from signal input ports to signal output ports. In this way, by measuring changes in the positions of mirrors deflecting reference beams, corrections to positions of all mirrors to minimize transmission losses for all connections can be obtained.

In some embodiments of the invention, a factory calibration can be performed as part of the production of the switch. In some embodiments, a look-up table can be constructed that indicates positioning of each mirror in each mirror array for direction of signal light between a port associated with each mirror and a second port, which may be associated with a mirror on a second mirror array. During factory calibration, a subset of the ports associated with the mirror array can be chosen for use in calibrations. In some embodiments, instead of a look-up table, parameters to a calculation algorithm that determines the mirror position can be determined.

During operation of the switching fabric, the selected subset of input ports can be re-calibrated periodically and the look-up table entries for all of the mirrors in the mirror array can be updated. Updating each of the entries of the mirrors in the mirror array can be determined by interpolating the calibration errors for the selected subset of input ports and adjusting the entries in the look-up table accordingly. In some embodiments, the interpolation can be a linear interpolation. In some embodiments, a more robust interpolation procedure, for example a spline interpolation method, can be utilized.

These and other embodiments are further discussed below with respect to the following figures.

DETAILED DESCRIPTION

Optical switching fabrics, an alternative term used here for optical fiber switches, are devices with multiple input ports and multiple output ports that allow an optical signal entering the device on any input port to be directed to any output port. A method of controlling an optical switching fabric according to the present invention can compensate for mechanical and other distortions without the need to measure losses along all optical paths linking input ports and output ports.

Figure 1:
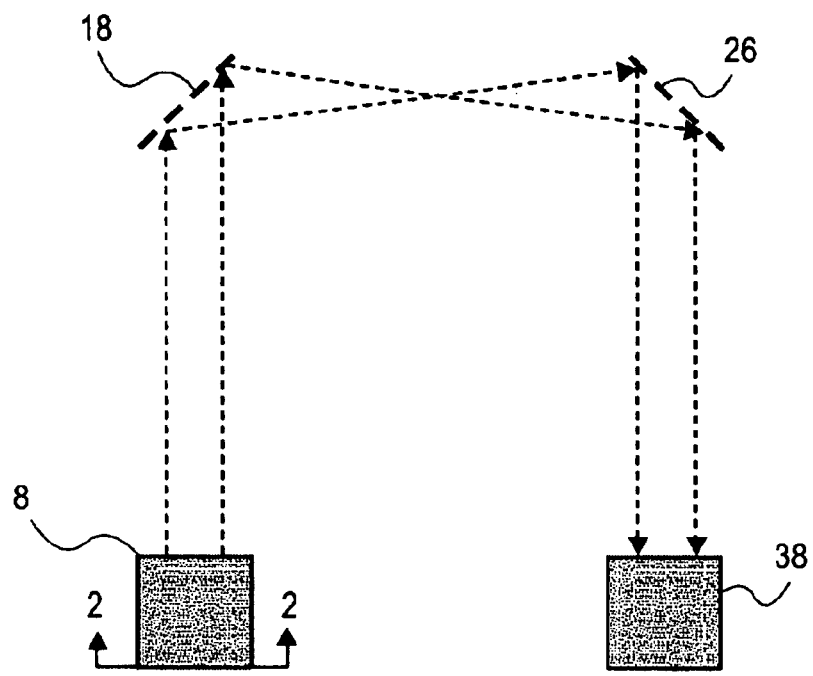
FIG. 1 is a schematic illustration of a generic 2N configuration optical switching fabric in which methods according to embodiments of the present invention can be practiced.

The method is applicable to 2N configuration optical switching fabrics based on two arrays of MEMS mirrors (mirror arrays), as depicted schematically in FIG. 1. Alternatively, a method according to the present invention can be applied to any system with a MEMS array.

FIG. 1 shows an embodiment of an optical switching fabric that utilizes a calibration system according to the present invention. In the switching fabric shown in FIG. 1, an input signal carried on an optical fiber connected to input fiber block 8 is deflected by a mirror on the first mirror array 18 to a selected mirror on the second mirror array 26, which deflects the signal to a corresponding output fiber connected to output fiber block 38. The positions of the mirrors to connect a particular input port to a particular output port, i.e. to connect a particular input fiber to a particular output fiber, are computed from an algorithm or are found in a look up table. In some embodiments, the entries to the look-up table or the parameters controlling the algorithm are generated in a factory calibration process.

According to an aspect of the present invention, a subset of fibers connected to the input fiber block are dedicated to carrying reference light beams. By measuring distortions in the positions of the mirrors deflecting references beams, corrections to the positions of all the mirrors to minimize transmission losses for all connections can be obtained. Corrections to all of the positions based on the errors measured for the subset can be determined by interpolation algorithms. The interpolation algorithms, for example, can utilize a linear interpolation, a spline-based calculation, or any other calculation that predicts the adjustment required by mirrors on the mirrors based on errors measured at a subset of the mirrors.

In the optical switching fabric of FIG. 1, fibers attached to the input fiber block 8 are positioned so the light beams emitted from the block are parallel to each other. Typically, the fibers form a two-dimensional array at the fiber block. Similarly, the output fibers attached to the output block are positioned to accept parallel light beams deflected by the second mirror array. There is a one-to-one correspondence between an input fiber and a mirror in the first mirror array and similarly, there is a one-to-one correspondence between an output fiber and a mirror in the second mirror array. Fibers in the input fiber block are arranged such that fibers carrying reference signals are interspersed with fibers carrying data signals. The reference input fibers are coupled to reference light beam sources. Reference output fibers are coupled to reference photodetectors. Proper spacing of the reference fibers in relation to the signal-carrying fibers assures that the reference fibers capture the impact of environmental changes on the physical parameters of the switch.

Figure 2:
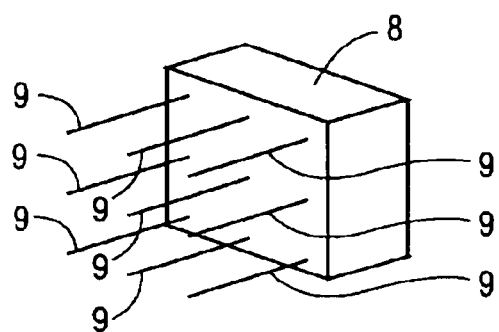
FIG. 2 is a perspective view of an input fiber block taken at cross section 2—2 of FIG. 1.

In the present method, first the positions of reference beams are selected. One alternative is to place the reference fibers generally symmetrically on the input fiber block. For example, nine reference fibers 9 could be selected as the corners, centers of sides, and center of a rectangular input fiber block 8, as illustrated in FIG. 2. Output reference fibers could be selected correspondingly on the output fiber block. Another alternative is to first determine the actual mirror positions, for all mirrors, corresponding to maximum throughput, and to compute the distortion as the difference between the actual optimum positions and precalculated positions based on the switch design. A distortion curve can be defined as the distortion across a row or column of points in a matrix, where each point corresponds to a connection between a particular input port and a particular output port, Reference fibers can be selected such that a curve fit through the distortions determined at a small number of reference fibers provides a reasonable approximation to the distortion curve for all connections. In general, any number of reference fibers can be utilized. For example, two reference fibers allow for corrections due to a simple rotation and a simple translation. More reference fibers allow for better approximations to be made to the distortion of the optical path geometry.

To recalibrate the optical switch to compensate for environmental changes, periodically the optimum positions for the mirrors corresponding to the reference fibers are remeasured. In the so-called "straight-through" mode, the mirror positions to maximize the intensity of a reference signal deflected from a particular reference input fiber to a corresponding reference output fiber is obtained. In a second, so-called "cross-coupling" mode, the mirror positions to make all possible combinations of reference input fibers and output reference fibers are determined. In switches that maintain uniformity of physical parameters, a small number of reference fibers is sufficient to approximate all the changes within the system. For example, for a switching fabric with 1200 input ports and 1200 output ports, excellent control may be obtained with less than about 25 reference input fibers and reference output fibers. In some embodiments, nine reference input fibers and nine reference output fibers are utilized.

The corrections to the positions of all the mirrors, connecting signal input ports with signal output ports, are computed by interpolation from the corrections to the mirror positions determined at the reference fibers, using the functional forms of the predetermined distortion curves determined during factory calibration. In this way, without measuring losses along the signal beams, the optical switch can be continuously recalibrated. The present method takes advantage of the fact that the distortions can be expected to be predictably distributed across the structure. The assumption of correlated distortion is particularly appropriate for MEMS based mirror systems including mirror arrays that are simultaneously manufactured and are therefore almost identical in mechanical aspects.

Figure 3:
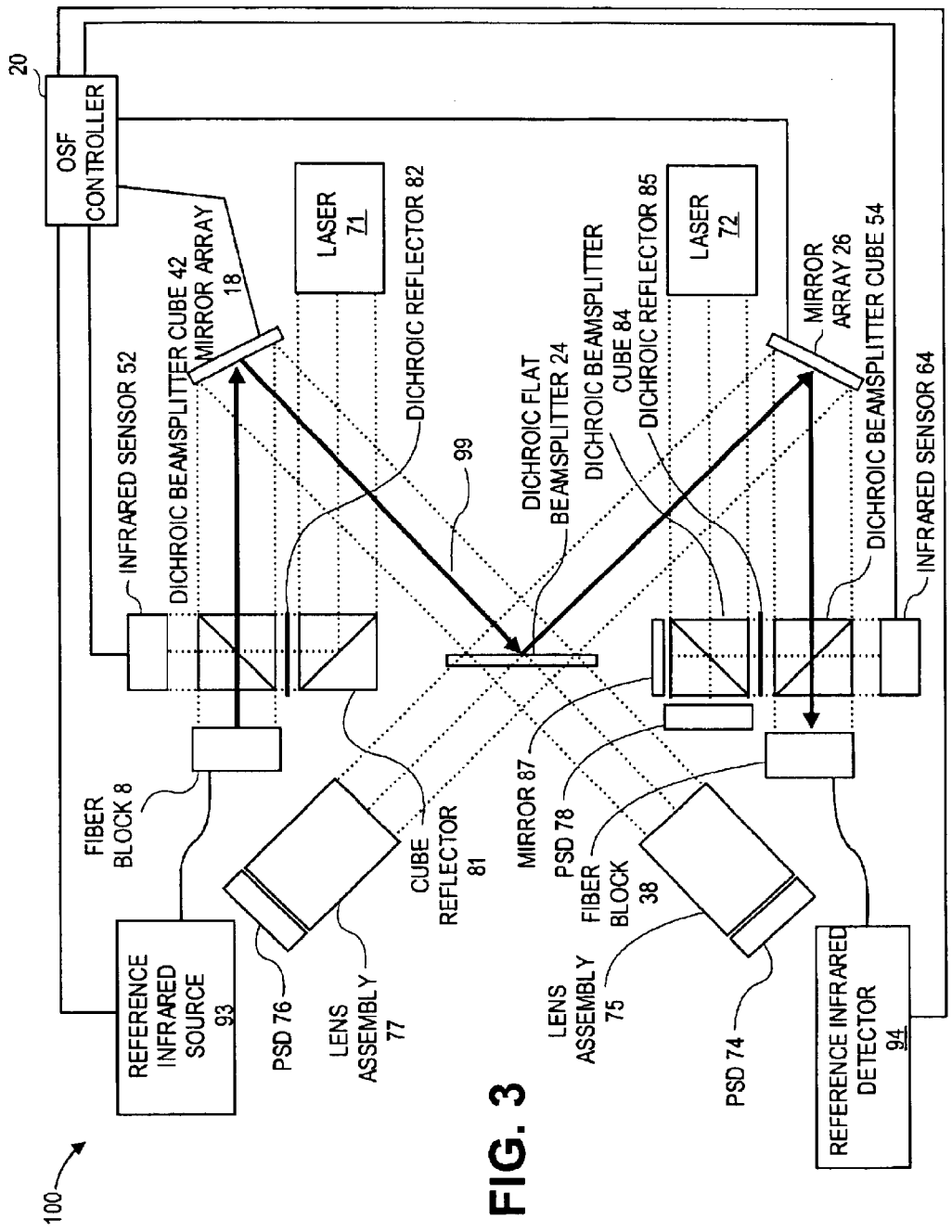
FIG. 3 is a schematic diagram of an optical switching fabric design in which methods according to embodiments of the present invention can be practiced.

The calibration method is further illustrated with respect to the operation of optical switching fabric (OSF) 100, shown schematically in FIG. 3. OSF 100 is typically used to switch optical signals at infrared wavelengths for telecom applications. The optical path 99 linking input fibers coupled to input fiber block 8 to output fibers, coupled to output fiber block 38, includes a dichroic flat beamsplitter 24 between the first mirror array 18 and the second mirror array 26. OSF 100 operates under the control of an optical switching fabric controller (OSFC) 20, which controls the orientation of the micro mirrors to provide the desired connections. The optical configuration of OSF 100 is described in U.S. patent application Ser. No. 10/002,310, now issued U.S. Pat. No. 6,636,656, which is incorporated herein by reference.

OSF 100 further includes infrared sensors, such as infrared cameras, that provide information about incoming and outgoing light beams. Infrared sensors 52 and 64 are positioned near input fiber block 8 and output fiber block 38, respectively, to monitor the intensities of input signal light, of signal light that has traversed the system, and of signal light reflected off fiber block 38 after being routed through the system. Outgoing signal light backreflected from fiber block 38 is at a minimum for properly aligned connections.

The elements used to control OSF 100 also include control lasers that emit at a wavelength distinct from the signal wavelengths and position sensing detectors that respond to the control laser wavelength. The output of the position sensing detectors is indicative of the positions of the micro mirrors. The control laser beams pass through the optical system on much the same beam path as that of the signal beams.

A light beam from a first control laser 71 illuminates the first mirror array 18 via cube reflector 81, dichroic reflector 82 and dichroic beamsplitter cube 42, as illustrated in FIG. 3. Individual light beams deflected by the micro mirrors in the first mirror array 18 are detected by position sensing detector (PSD) 74. The optical path between mirror array 18 includes the dichroic flat beamsplitter 24, and a first lens assembly 75, which focuses the beams onto PSD 74. Output signals from PSD 74 are indicative of the positions of the micro mirrors in the first mirror array 18.

In an analogous optical path, a light beam from a second control laser illuminates the second mirror array 26 and is detected by a second PSD 76, whose output signals are indicative of the positions of the micro mirrors in second array 26. The complete optical path of the second control laser includes dichroic beamsplitter cube 84, dichroic reflector 85, dichroic beamsplitter cube 54, second mirror array 26, flat beam splitter 24, and lens assembly 77.

Inclusion of a third PSD 78 that detects light from first control laser 71 that has been deflected by both mirror arrays enables high precision alignment and control of OSF 100. Mirror array 26 deflects the control beams originating from control laser 71 and deflected by both mirror arrays, onto dichroic beam splitter cube 54 which deflects them through dichroic reflector 85. A portion of the control beams passes through dichroic beamsplitter cube 84 to a mirror 87 which retroreflects the beams to dichroic beamsplitter cube 84 which deflects them onto the third PSD 78. Since the control laser beams have been deflected by both mirror arrays before reaching the third PSD 78, PSD 78 is very sensitive to small mirror displacements OSF 100 further includes a reference infrared source 93 couplet to reference input fibers at input fibers block 8 and reference infrared detector 94 coupled to reference output fibers at output fiber block 38. Infrared source 93 and infrared detector 94 can be used in a recalibration method according to the present invention.

Figure 4:
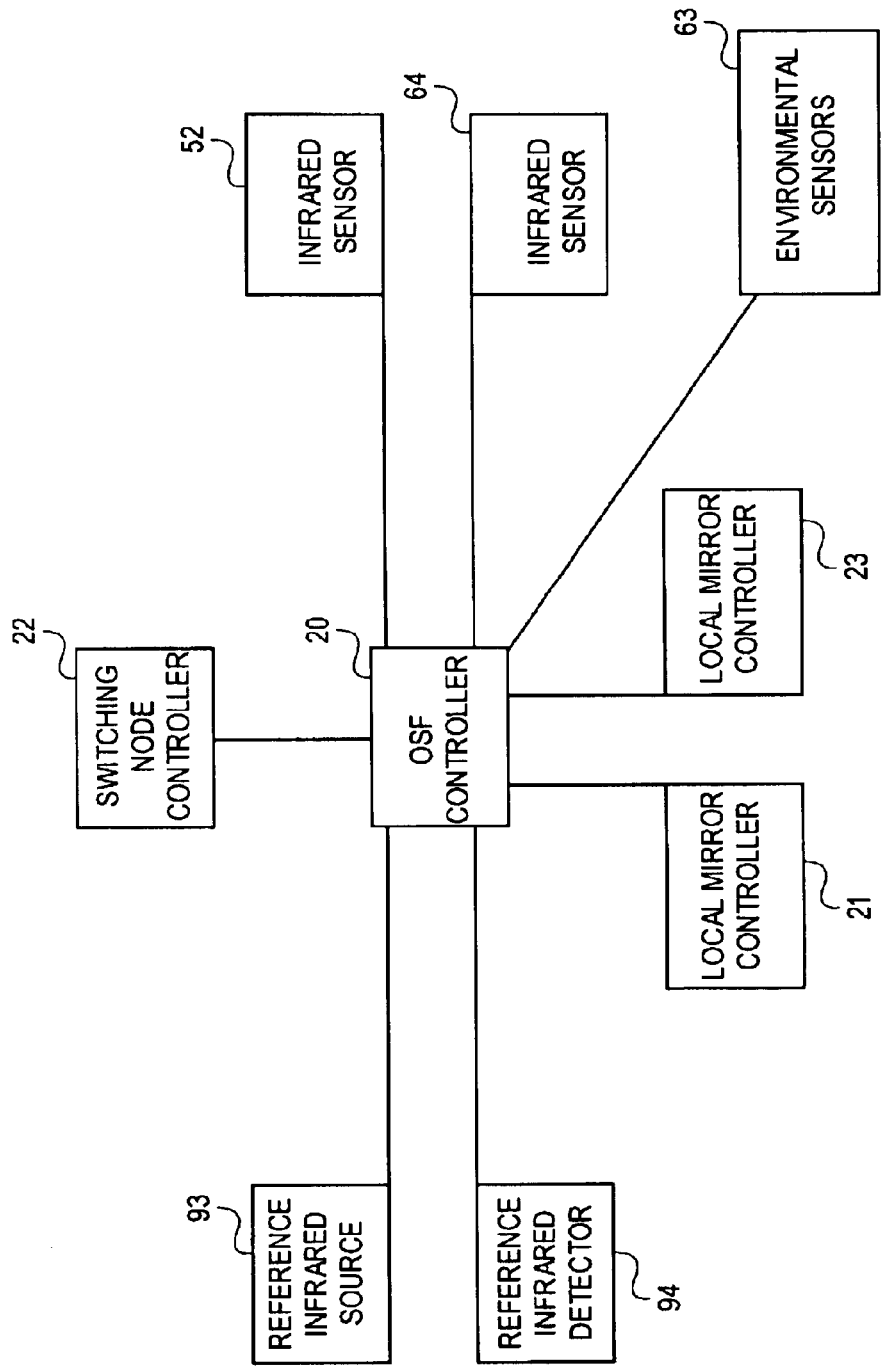
FIG. 4 is a block diagram of a control system for the optical switching fabric of FIG. 3.

Optical switching fabric controller 20 is a hardware and software module that controls OSF 100 in response to signals received from an external network and in response to signals received from sensors within the switching fabric. The electrical connections of OSFC 20 are shown in FIG. 4. OSFC 20 is connected to a switching node control module 22 which receives routing instructions from the network and translates them into instructions to connect a particular input port of OSF 100 to a particular output port. To execute connection instructions, OSFC 20 issues instructions to a first local mirror controller 21 which controls the motion of micro mirrors on the first mirror array 18 and to a second mirror controller 23 which controls the motion of micro mirrors on the second mirror array 26. The operation of mirror controllers 21 and 23 is further described in U.S. patent application Ser. No. 10/003,659, now issued U.S. Pat. No. 6,614,954, which is incorporated herein by reference.

OSFC 20 is also electrically connected to send instructions to and receive signals from infrared sensors 52 and 64, reference infrared source 93, and reference infrared detector 94. In addition, OSF 100 may include environmental sensors 63 that measure, for example, local conditions of temperature, pressure, acceleration, power, and relative humidity within the switching fabric. OSFC 20 may control the switching fabric in response to signals received from the sensors 52, 64, and 63.

In some embodiments, recalibrating of OSF 100 uses signals generated by position sensing detectors 74 and 76 in response to control laser beams from lasers 71 and 72 to indicate the positions of individual mirrors on mirror arrays 18 and 26. There is a one-to-one correspondence between a position specified by two coordinates, e.g. (x,y), on a PSD and the orientation of a particular micro mirror on a mirror array. For example, in the embodiment shown in FIG. 3, the positions of individual mirrors on mirror array 18 can be monitored by position sensitive detector 74. Additionally, the positions of individual mirrors on mirror array 26 can be monitored by position sensitive detector 76. Therefore, mirror positions can be specified by PSD values and local mirror controllers 21 and 23 can use feedback loops to move the mirrors to provide the specified PSD values in order to control individual mirrors. Correlation of mirror position with PSD signals is further described in U.S. patent application Ser. No. 09/999,878, U.S. patent application Ser. No. 09/999,610, both of which are incorporated herein by reference and in U.S. patent application Ser. No. 10/003,659, now issued U.S. Pat. No. 6.614.954.

In some embodiments, before OSF 100 is put into service a factory calibration process is performed to generate an alignment look up table for every connection through the switching fabric. The look-up table, then, includes data for the position of each mirror of a MEMS array in order to connect an input port to any of the output ports. Look-up tables for each mirror array in switching fabric 100 (e.g., mirror arrays 18 and 26) can be constructed. During the factory calibration process, a source of infrared light at a telecommunication frequency is temporarily provided to all input ports on input fiber block 8 and an infrared detector is temporarily provided to all output ports on output fiber block 38.

Figure 5A:
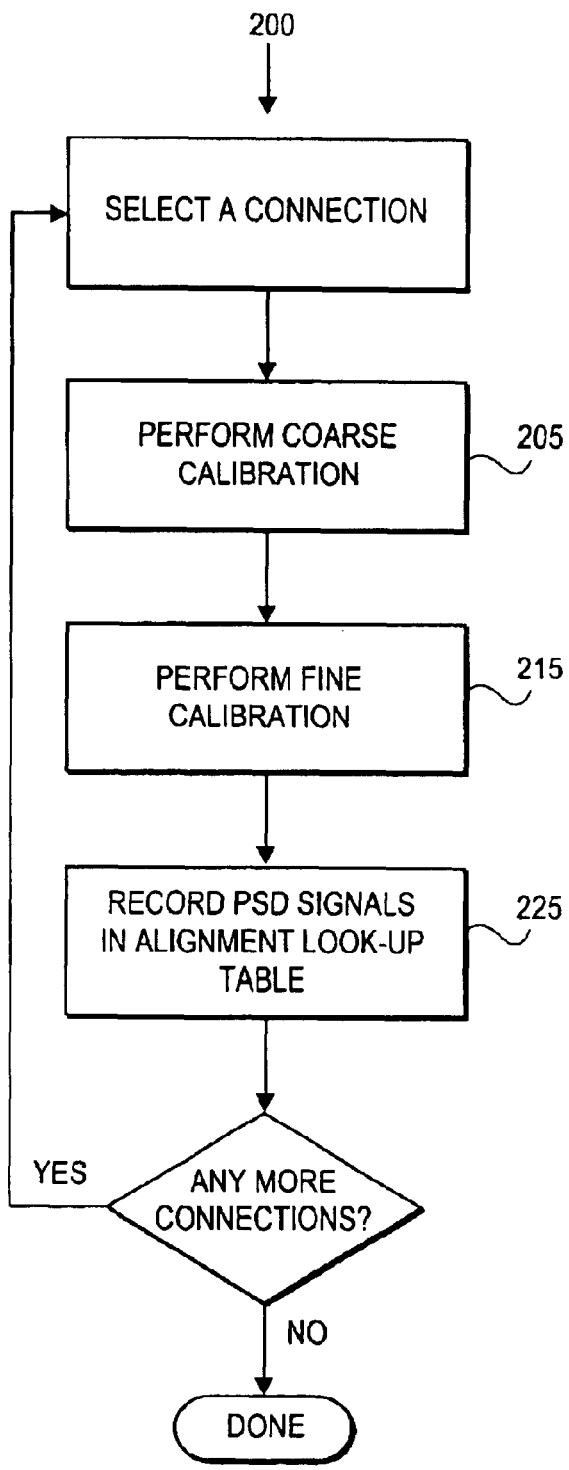
FIG. 5A is a flow diagram of a factory calibration process for an optical switching fabric as in FIG. 3.

FIG. 5A illustrates one implementation of a factory calibration process 200 for OSF 100. Calibration process 200 begins by selecting a connection configuration. For example, the connection configuration adjusts each mirror in mirror array 18 and each mirror in mirror array 26 in switch fabric 100 (FIG. 3) so that each of the input ports is connected to each of the output ports. In a coarse calibration step 205 the positions of the mirror on the first mirror array 18, and of the mirror on the second mirror array 26 for a specified connection are varied within a prespecified region around their expected positions, calculated from the switching fabric design, until a signal is recorded on the third high resolution PSD 78 or until infrared (IR) is detected at IR detector 94. Third PSD 78 can be a high-precision sensor so that small variations of mirror position are detectable. Alternatively, the positions of the mirrors on the first mirror array 18 and the mirrors on the second mirror array 26 can be varied until an infrared signal is recorded on the selected output port, as measured by reference infrared detector 94. Then, in a fine calibration step 215, the position of the mirror in the second mirror array is varied in a smaller region around the result of the coarse calibration, to maximize the intensity of the infrared signal on the output port while recording a signal on the third PSD 78. The values of the signals on the first PSD 74, second PSD 76, and third PSD 78 at the optimal mirror positions are recorded in an alignment look-up table at step 225. The process is repeated for all possible combinations of connections. Fine calibrations steps using PSD 78 can be avoided if PSD 74 and PSD 76 are sufficient to provide the resolution needed for maximizing IR connections.

Figure 5B:
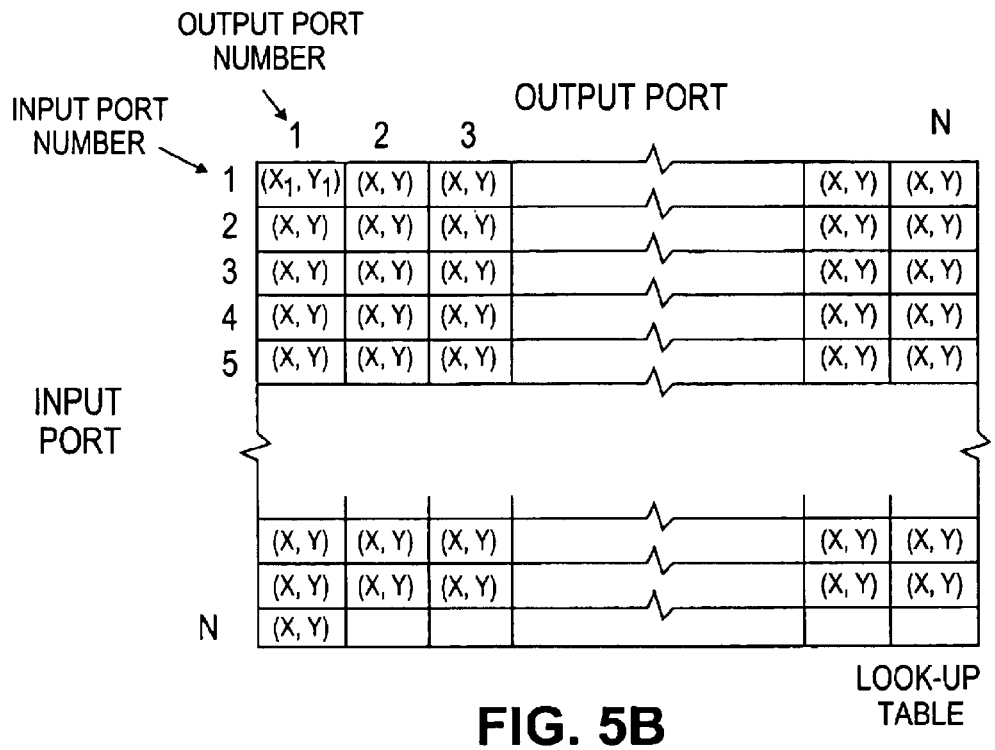
FIG. 5B illustrates a look-up table constructed in the process illustrated in FIG. 5A.

FIG. 5B shows an example table produced in step 225 of algorithm 200 in FIG. 5A. The look-up table shown in FIG. 5B is, for example, appropriate for either mirror array 18 or mirror array 26 in FIG. 3. A similar table can be utilized in any system with a mirror array and a PSD which monitors the positions of mirrors on the mirror array. The table in FIG. 5B records the x and y values from the PSD, for example PSD 74 for mirror array 18 or PSD 76 for mirror array 26, for each position of each mirror in the mirror array. For example, if the table shown is for mirror array 18, mirror 3 is connected to input port 3. The PSD position to connect port 3 with, for example, port 2 is given in the third row and second column of the table. Further information may also be contained in the table, for example the position of the combined mirrors on third PSD 78 may be recorded.

Figure 6B:
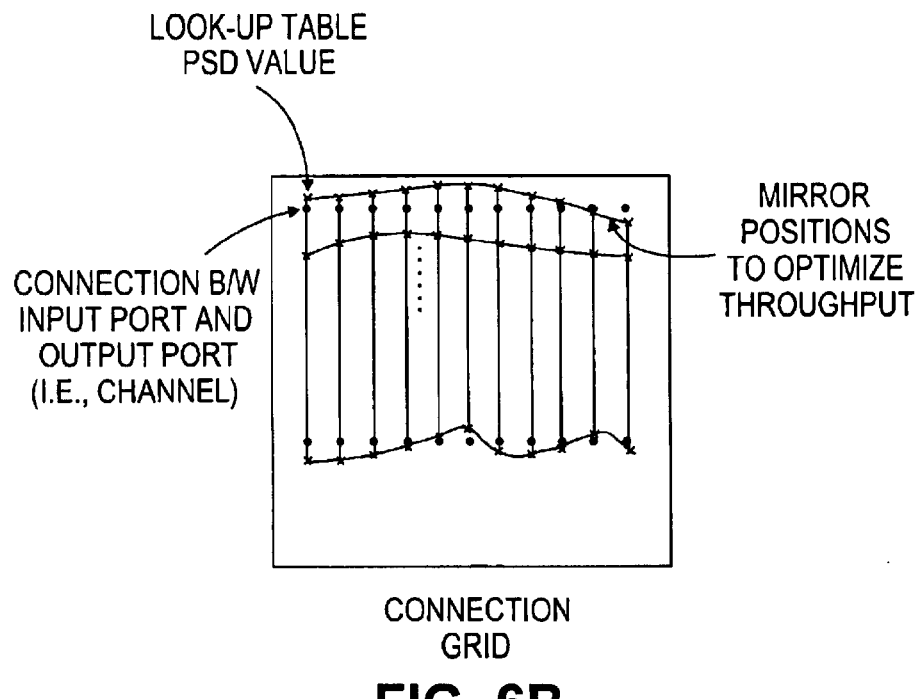
FIG. 6B shows schematically calibration signals on a PSD during a calibration procedure as illustrated in FIG. 6A.
Figure 6A:
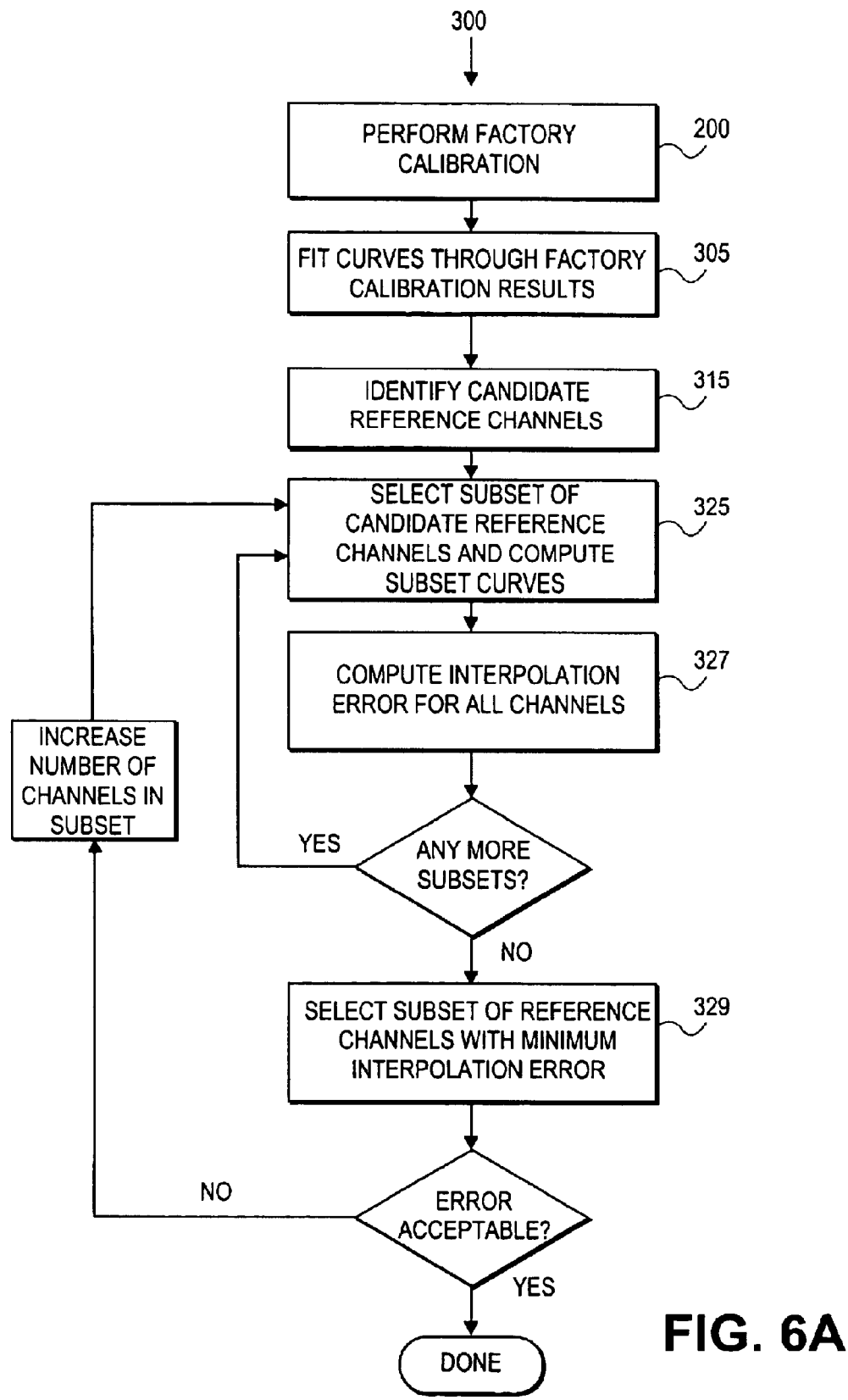
FIG. 6A shows a flow diagram of a process of selecting reference channels for an optical switching fabric as in FIG. 3, according to embodiments of the present invention.

FIG. 6A shows how the results of the factory calibration are used to determine optimal numbers and positions of reference ports to be used with infrared source 93 and infrared detector 94 for the recalibration method. As shown in FIG. 6B, a two-dimensional connection grid is defined for the points from each mirror of the mirror array on the PSD that monitors the positions of mirrors on that mirror array. For example, the positions of light from mirrors on mirror array 18 on PSD 74, in which each point ($N_{in}$, $N_{out}$) represents a connection between an input port $N_{in}$ and an output port $N_{out}$. A particular connection $N_{in}$ to $N_{out}$ is termed a channel. A multidimensional vector $X_{in,out}$, corresponding to PSD values stored in the alignment look-up table, is associated with each channel. Continuous intersecting curves are formed at step 305, by fitting functional forms, for example by fitting polynomial functions using a least squares fitting procedure, to the vectors $X_{in,out}$, across the rows and columns of the connection grid. These curves are shown connecting the points labeled x in FIG. 6B and represent the positions of mirrors in a mirror array that optimize throughput of the switching fabric.

Next, at step 315, candidate reference channels are identified based, for example, on finding the channels with the largest interpolation error and the largest factory calibration (FC) sensitivity. The interpolation error is the difference at each channel between the vector X stored in the alignment look-up table and the value predicted by the least squares fit. The least squares fit is most affected by the points which have the largest interpolation error. The FC sensitivity is the difference between the vector X and the expected values calculated from the switching fabric design.

At the next stage, the actual reference input and output ports are selected from the candidate reference channels. Different subsets of the candidate reference channels are examined, at step 325, and for each one, subset functional forms are determined by least squares fit through the connection grid rows and columns of vectors X using only the subset channels. For each subset, the interpolation error at each channel position, between the factory calibration value X, and the value predicted from the subset functional form is evaluated, at step 327. Sensitivity analysis can be utilized in determining which channels have the greatest influence on the least squares fit. The subset with the minimal error is identified, at step 329. If the error is larger than an acceptable error, the number of candidate reference channels is increased (step 341) and the process of testing fits to subsets of candidate reference channels is repeated until a subset with an acceptable error is identified. The identified subset of candidate reference channels allows reference input ports $R_{in}$ and reference output ports $R_{out}$ to be determined and connected to infrared source 93 and infrared detector 94, respectively. In some embodiment, other considerations may be considered. For example, in some embodiments, the number of channels utilized for calibration can be fixed.

To recalibrate OSF 100, periodically the optimal positions of the mirrors for all reference channels connecting the reference input ports $R_{in}$ to the reference output ports $R_{out}$ are updated using source 93 and detector 94. The updating process uses an analogous process to the original factory calibration but is applied to only the small number of reference channels rather than to all channels, as in the factory calibrations. Updated values of the vectors X for all channels are computed by interpolation from the updated reference values, using the reference least squares fit functional form, and stored in the alignment look-up tables. In this way, optimal connections for all channels of OSF 100 can be maintained even when the switching fabric experiences changing environmental conditions.

Figure 7:
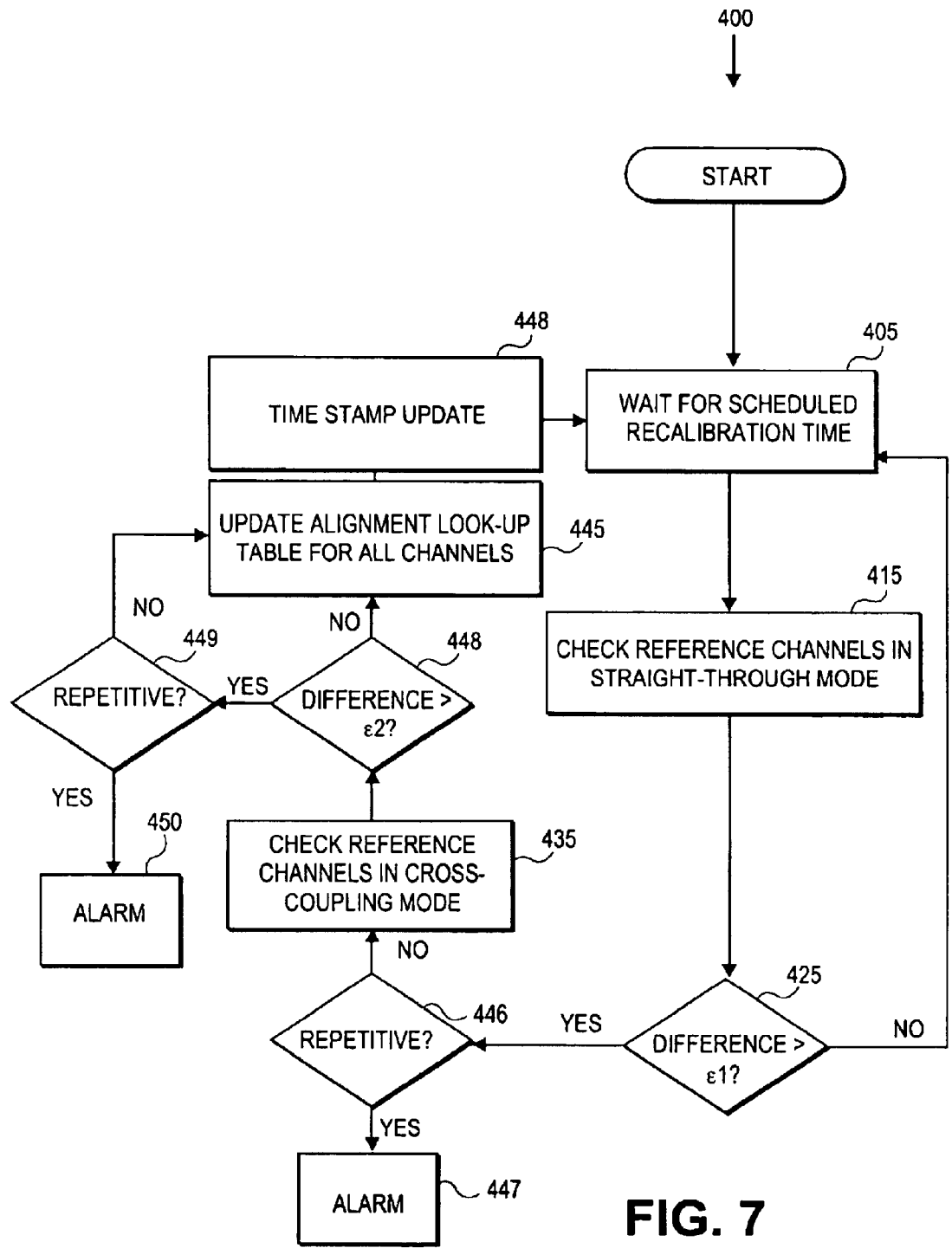
FIG. 7 is a flow diagram of a recalibration process for an optical switching fabric as in FIG. 3, according to embodiments of the present invention.

A particular implementation 400 of a recalibration process for OSF 100 is illustrated in FIG. 7. The process is performed at a scheduled recalibration time, step 405. First, at step 415, the positions of the reference channels are checked in the "straight-through" mode, that is for connections where $R_{in}$ equals $R_{out}$. If the change in the vectors X is greater than some threshold $\epsilon 1$ in step 425, then algorithm 400 proceeds to step 446. In step 446, algorithm 400 checks to see if too many iterations have been performed. If too many iterations have been performed, indicating that the system may not be capable of calibration, then an alarm is set in step 447 and the algorithm halts, indicating a malfunction. If not, then algorithm proceeds to step 435 where the positions are checked for all possible combinations of reference input channels and output reference channels, in the "cross coupling" mode. If the change in vectors X is greater than some threshold $\epsilon 2$ in step 448, then algorithm 400 proceeds to step 449. In step 449, algorithm 400 checks to see if too many iterations have been performed. If too many iterations have been performed, indicating that the system may not be capable of calibration, then an alarm is set in step 450 and algorithm 400 halts indicating system malfunction. The alignment look-up table associated with each mirror array is then updated at step 445 using the results of steps 415 and 435. During update step 445, position entries for a look table such as that shown in FIG. 5B are determined, for example by interpolation between the points computed with the reference beams. The update can be time stamped in step 448 so that the condition in step 446 can be checked.

The recalibration process 400 may optionally include a comparison after step 445 of the changes in the vectors X in the cross-coupling mode. If, for a particular reference port, the changes are greater than some threshold $\delta$, the corresponding reference channels are removed from the system and the system is reconfigured without the faulty reference port.

Although the invention has been described with reference to particular optical components, sensors, and optical signal paths, the description is only an example of the invention's application and should not be taken as a limitation. Additional, fewer, or different optical components or light sources may be used in different optical configurations, as known to those skilled in the art. For example, although the invention was described using three position sensing detectors for fine control of mirror positions, the present methods may be practiced in optical configurations using only two position sensing detectors, or one timeshared position sensing detector. Further, while the present methods list particular principal steps, additional preliminary set-up functions, control checks, and other standard features, known in the practice of programming control functions may also be included. All such adaptations and combinations of the features disclosed are within the scope of the invention as defined by the following claims.

I claim:

1. An optical switch comprising:
    a first plurality of ports comprising signal input ports and reference input ports;
    a second plurality of ports comprising signal output ports and reference output ports;
    a first plurality of mirrors disposed on a first surface;
    a second plurality of mirrors disposed on a second surface;
        wherein each one of the first plurality of mirrors is individually controllable to direct light incident from a corresponding one of the first plurality of ports to any one of the second plurality of mirrors, and
        wherein each one of the second plurality of mirrors is individually controllable to direct to a corresponding one of the second plurality of ports, light incident from any one of the first plurality of mirrors;
    a reference light source coupled to provide reference light to the reference input ports;
    a reference detector coupled to the reference output ports;
        wherein measured changes in optimal positions of mirrors in the first plurality of mirrors and of mirrors in the second plurality of mirrors for directing reference light from reference input ports to reference output ports can be used to determine changes in optimal positions of mirrors in the first plurality of mirrors and of mirrors in the second plurality of mirrors for directing signal light from signal input ports to signal output ports; and
    a look-up table associated with the first plurality of mirrors, the look-up table including data describing an optimal position of each mirror of the first plurality of mirrors to connect signal light between any signal input port and any signal output port.

2. The optical switch of claim 1 wherein the first plurality of ports comprise a two-dimensional array and wherein the reference input ports are interspersed among the signal input ports in two dimensions, and wherein the second plurality of ports comprise a two-dimensional array and wherein the reference output ports are interspersed among the signal output ports in two dimensions.

3. The optical switch of claim 1 further comprising:
    a first control light source located to illuminate the first plurality of mirrors with control light;
    a first position sensing detector located to detect control light that has been reflected by the first plurality of mirrors, wherein signals provided by the first position sensing detector correspond to the positions of the first plurality of mirrors;
    a second control light source located to illuminate the second plurality of mirrors with control light; and
    a second position sensing detector located to detect control light that has been reflected by the second plurality of mirrors, wherein signals provided by the second position sensing detector correspond to the positions of the second plurality of mirrors.

4. The optical switch of claim 3, further comprising:
    a third position sensing detector located to detect control light from the first control light source that has been reflected by the first plurality of mirrors and the second plurality of mirrors.

5. The optical switch of claim 1, further comprising:
    a first infrared sensor optically coupled to the first plurality of ports to monitor intensity of signal light at the signal input ports; and
    a second infrared sensor optically coupled to the second plurality of ports to monitor intensity of signal light at the signal output ports.

6. The optical switch of claim 1, further comprising a second look-up table associated with the second plurality of mirrors, the second look-up table including data describing an optimal position of each mirror of the second plurality of mirrors to connect signal light between any signal input port and any signal output port.

7. The optical switch of claim 1, further comprising a dichroic flat beamsplitter to reflect signal light and reference light between the first plurality of mirrors and the second plurality of mirrors.

8. An optical switch, comprising:
a first plurality of ports comprising signal input ports and reference input ports;
a second plurality of ports comprising signal output ports and reference output ports;
a first plurality of mirrors disposed on a first surface;
a second plurality of mirrors disposed on a second surface;
wherein each one of the first plurality of mirrors is individually controllable to direct light incident from a corresponding one of the first plurality of ports to any one of the second plurality of mirrors, and
wherein each one of the second plurality of mirrors is individually controllable to direct to a corresponding one of the second plurality of ports, light incident from any one of the first plurality of mirrors;
a reference light source coupled to provide reference light to the reference input ports;
a reference detector coupled to the reference output ports;
wherein measured changes in optimal positions of mirrors in the first plurality of mirrors and of mirrors in the second plurality of mirrors for directing reference light from reference input ports to reference output ports can be used to determine changes in optimal positions of mirrors in the first plurality of mirrors and of mirrors in the second plurality of mirrors for directing signal light from signal input ports to signal output ports; and
a dichroic flat beamsplitter to reflect signal light and reference light between the first plurality of mirrors and the second plurality of mirrors.

9. The optical switch of claim 8, wherein the first plurality of ports comprise a two-dimensional array and wherein the reference input ports are interspersed among the signal input ports in two dimensions, and wherein the second plurality of ports comprise a two-dimensional array and wherein the reference output ports are interspersed among the signal output ports in two dimensions.

10. The optical switch of claim 8, further comprising:
a first control light source located to illuminate the first plurality of mirrors with control light;
a first position sensing detector located to detect control light that has been reflected by the first plurality of mirrors, wherein signals provided by the first position sensing detector correspond to the positions of the first plurality of mirrors;
a second control light source located to illuminate the second plurality of mirrors with control light; and
a second position sensing detector located to detect control light that has been reflected by the second plurality of mirrors, wherein signals provided by the second position sensing detector correspond to the positions of the second plurality of mirrors.

11. The optical switch of claim 10, further comprising:
a third position sensing detector located to detect control light from the first control light source that has been reflected by the first plurality of mirrors and the second plurality of mirrors.

12. The optical switch of claim 8, further comprising:
a first infrared sensor optically coupled to the first plurality of ports to monitor intensity of signal light at the signal input ports; and
a second infrared sensor optically coupled to the second plurality of ports to monitor intensity of signal light at the signal output ports.

13. The optical switch of claim 8, further comprising:
a look-up table associated with the first plurality of mirrors, the look-up table including data describing an optimal position of each minor of the first plurality of mirrors to connect signal light between any signal input port and any signal output port.

* * * * *